US012172456B2

(12) United States Patent
Khoshnegar Shahrestani et al.

(10) Patent No.: US 12,172,456 B2
(45) Date of Patent: Dec. 24, 2024

(54) ANTICOUNTERFEITING FOIL

(71) Applicant: Authentix, Inc., Addison, TX (US)

(72) Inventors: Milad Khoshnegar Shahrestani, Coquitlam (CA); Joseph Brown, Gatineau (CA); Clinton K. Landrock, North Vancouver (CA); Gilles Girouard, Orleans (CA)

(73) Assignee: Authentix, Inc., Addison, TX (US)

( * ) Notice: Subject to any disclaimer, the term of this patent is extended or adjusted under 35 U.S.C. 154(b) by 0 days.

(21) Appl. No.: 18/480,401

(22) Filed: Oct. 3, 2023

(65) Prior Publication Data

US 2024/0109362 A1 Apr. 4, 2024

Related U.S. Application Data

(60) Provisional application No. 63/412,820, filed on Oct. 3, 2022.

(51) Int. Cl.
*B42D 25/387* (2014.01)
*B42D 25/29* (2014.01)
*B42D 25/328* (2014.01)
*B42D 25/425* (2014.01)
*B42D 25/47* (2014.01)

(52) U.S. Cl.
CPC ........... *B42D 25/387* (2014.10); *B42D 25/29* (2014.10); *B42D 25/328* (2014.10); *B42D 25/425* (2014.10); *B42D 25/47* (2014.10)

(58) Field of Classification Search
CPC .. B42D 25/387; B42D 25/328; B42D 25/425; B42D 25/47
USPC ........ 283/67, 72, 74, 83, 87, 89, 91, 94, 98, 283/901
See application file for complete search history.

(56) References Cited

U.S. PATENT DOCUMENTS

2019/0232708 A1* 8/2019 Holmes .................. B42D 25/45

* cited by examiner

*Primary Examiner* — Justin V Lewis
(74) *Attorney, Agent, or Firm* — Conley Rose, P.C.; Rodney B. Carroll

(57) ABSTRACT

An anticounterfeiting device having a film stack including functionalized microstructures and nanostructures that produces overt and covert features under ambient visible and ultraviolet light, as well as methods of use and construction are disclosed herein.

20 Claims, 4 Drawing Sheets

ANTICOUNTERFEITING FOIL

CROSS REFERENCE TO RELATED APPLICATION

The application claims priority under 35 U.S.C. § 119 from U.S. Provisional Application No. 63/412,820, entitled "Anticounterfeiting Foil," filed on Oct. 3, 2022, the subject matter of which is incorporated herein by reference.

TECHNICAL FIELD

The present invention is in the field of banknote and brand security, and more specifically, to anticounterfeiting security features.

BACKGROUND

Some interactive anticounterfeiting features which function in ambient light are enabled by diffractive or absorptive nanostructures and/or microstructures using metallic or dielectric coatings, termed "overt features." Such features offer optically static or variable visual effects when the observer navigates different viewing angles of the overt feature. Depending on the application, the overt features can be produced at volume using thermal embossing or UV-NIL nanoimprinting. While thermal embossing has been utilized to produce stripe, patch, and thread anticounterfeiting features at volume in a roll-to-roll setup, UV-NIL has been employed to form surface relief devices for stripe and thread application. Such surface-applied features usually operate in the reflection mode. The embossed or imprinted layer is functionalized by coating up to only a few thin film metal or dielectric layers, which provide reflection efficiency.

Ink-based material which fluoresces at visible or infrared (IR) wavelengths are common covert anticounterfeiting features, e.g., "covert features". In such cases, the ink feature fluoresces an image or pattern when illuminated by the proper excitation source, such as UV or IR lamp or diode, and the fluorescence spectrum can span from visible to IR wavelengths based on the ink material composition. Such anticounterfeiting features usually display static imagery when optically excited but do not offer an interactive functionality. A more advanced generation of covert anticounterfeiting features combine ink layers and multi-layer stack of dielectric thin films (see U.S. Pat. No. 9,170,417). The multi-layer stack host Fabry-Perot resonances whose spectra are angular-dependent and can filter different components of the ink's fluorescence spectrum at different viewing angles. This mechanism can offer a colorshift effect when the stack and fluorescence resonances are aligned properly. However, while covert features that provide interactivity through angular color dependence enhance security, it would be desirable to provide security features that combine enhanced protection with ease of manufacture.

SUMMARY

It has been discovered that a foil stack of a security feature can integrate overt and covert features in a single anticounterfeiting device. This discovery has been exploited to develop the present disclosure, which, in part, is directed to an anticounterfeiting security device incorporating both overt and covert features and methods for producing the same, integrating both overt and covert features in the same optically interactive device to provide enhanced security.

In one aspect, the present disclosure provides a device, including: a film stack configured to display a plurality of images and emit light in a visible range, the film stack includes: a resin layer including a first periodic array of nanostructures in a first region and a second periodic array of nanostructures in a second region, the first region and the second region being on a common surface of the resin layer; a coating layer disposed over the common surface of the resin layer, wherein: the coating layer and the first periodic array of nanostructures are configured to interact with incident light to display a plurality of images to a user, each image displayed based on a different viewing angle of the user, and an ink layer disposed over a portion of the coating layer, the portion corresponding to the second region of the second periodic array of nanostructures wherein, the ink layer is configured to emit visible light when illuminated by the incident ultraviolet light, and wherein the coating layer and the second periodic array of nanostructures are configured so that incident ultraviolet light is transmitted through the second periodic array of nanostructures and the coating layer to the ink layer, and incident visible light emitted by the ink layer is filtered to produce an optical effect when viewed by the user.

In an example, the ink layer includes a plurality of UV-sensitive fluorescent compounds dispersed therethrough, the plurality of UV-sensitive fluorescent compounds are configured to emit visible light wherein when illuminated by ultraviolet light.

In an example, the coating layer and the first periodic array of nanostructures are configured to reflect incident light by plasmonic resonance to display the plurality of images. In the same or other examples, the first periodic array of nanostructures include diffractive nanostructures, and the coating layer and the first periodic array of nanostructures are configured to diffract incident light to display the plurality of images to the user In an example, the ink layer has a thickness in a range from about 1 μm to about 15 μm.

In an example, the device further includes a protective layer disposed over a surface of the resin layer opposing the common surface.

In an example, the protective layer includes a water-based material, a UV-curable material, or thermally-curable material.

In an example, the protective layer is disposed to a depth of about 2 μm to about 5 μm.

In an example, the protective layer is substantially transparent to the incident visible light and the incident ultraviolet light and has a refractive index within about 0.1 of a refractive index of the resin layer and can be configured to protect the device from mechanical and chemical damage.

In an example, the device further includes a bonding agent layer disposed between the coating layer and the ink layer, the bonding agent formulated to be substantially transparent to the incident visible light and the incident ultraviolet light and configured to protect the coating layer and the ink layer from delamination.

In an example, the first periodic array of nanostructures, or the second periodic array of nanostructures, includes a periodic array of blazed gratings, reflective plasmonic structures, or transmissive plasmonic structures.

In an example, the first periodic array of nanostructures includes a periodic array of blazed gratings and is about 300 nm or more in width, and each of the blazed gratings have a respective periodicity that is between about 300 nm and about 700 nm and a respective blaze angle of between about 20° and about 30°.

In an example, the first periodic array of nanostructures includes a periodic array of plasmonic reflective nanostructures, and each of the plasmonic reflective nanostructures have a respective periodicity that is between about 100 nm and about 300 nm.

In an example, the second periodic array of nanostructures has a periodicity of about 120 nm to about 700 nm, and each nanostructure has a height of about 50 nm to about 300 nm, and a lateral dimension of about 90 nm to about 300 nm.

In an example, each nanostructure has a cross-sectional shape of a rectangle, a triangle, a circle, a cross, or a hexagon.

In an example, each nanostructure is a pillar or a hole.

In an example, the first periodic array of nanostructures, the second periodic array of nanostructures, or both, is overlaid on a periodic array of microstructures, each microstructure having a largest dimension greater than a periodicity of the overlaid periodic array of nanostructures.

In an example, the coating layer includes a metallic material selected from aluminum, silver, alloys thereof, or a combination thereof; and the coating layer has a thickness in a range from about 30 nm to about 40 nm.

In an example, the combination of the coating layer and the second periodic array of nanostructures forms an optical filter configured to transmit ultraviolet (UV) light and block visible light at a wavelength range.

In an example, the visible light is filtered by the optical filter to produce a color, wherein the color is angle variant or invariant.

In an example, the device further includes an adhesive layer disposed over the ink layer and another portion of the coating layer having no ink layer disposed thereon.

In an example, the adhesive layer contacts a substrate comprising paper or a polymer.

In an example, the device is configured to be used as an anticounterfeiting feature.

In another aspect, the present disclosure provides a method, including: forming a film stack configured to display a plurality of images and emit a color in a visible range, wherein the forming includes: providing a carrier layer including a release layer; disposing a protective layer onto the release layer; disposing a resin layer over the protective layer; embossing a surface of the resin layer opposing the protective layer to form a first periodic array of nanostructures in a first region and a second periodic array of nanostructures in a second region; disposing a coating layer to cover the surface of the resin layer, wherein: the coating layer and the first periodic array of nanostructures are configured to interact with incident visible light to display a plurality of images, each image displayed based on a different viewing angle of a user viewing the incident visible light diffracted from the first periodic array of nanostructures, and disposing an ink layer over a portion of the coating layer corresponding to the second region of the second periodic array of nanostructures wherein, the ink layer is configured to emit visible light when illuminated by the incident ultraviolet light, wherein the coating layer and the second periodic array of nanostructures are configured so that incident ultraviolet light is transmitted through the second periodic array of nanostructures and the coating layer to the ink layer, and incident visible light emitted by the ink layer is filtered to produce an optical effect when viewed by the user.

In an example, the method further includes disposing a bonding agent layer between the coating layer and the ink layer, the bonding agent formulated to be substantially transparent to the incident visible light and the incident ultraviolet light and configured to protect the coating layer and the ink layer from delamination. In some examples, the first periodic array of nanostructures include diffractive nanostructures, and the coating layer and the first periodic array of nanostructures are configured to diffract incident light to display the plurality of images to the user.

In an example, the method further includes disposing an adhesive layer to cover the exposed first region and the ink layer.

In an example, the method further includes providing, before disposing the resin layer over the protective layer, a carrier substrate comprising a release layer, and contacting the protective layer to the release layer, and contacting the adhesive layer of the film stack to a substrate, and releasing the release layer from the protective layer, thereby depositing the film stack on the substrate.

In an example, the substrate includes a paper or a polymer.

In an example, the method is performed in a roll-to-roll process.

In an example, the roll-to-roll process is a flexographic printing process, a slot die process, a Mayer rod process, or Gravure printing process.

In an example, the coating layer and the first periodic array of nanostructures are configured to reflect incident by plasmonic resonance.

In another aspect, the present disclosure provides an anticounterfeiting feature, made using the method of an above aspect.

In another aspect, the present disclosure provides a method of displaying a plurality of images using an anticounterfeiting feature and emitting a color in a visible range, comprising: providing on a substrate, the anticounterfeiting feature; diffracting, by the anticounterfeiting feature, incident visible light to display a plurality of images to a user, each image displayed based on a different viewing angle of the user viewing the diffracted visible light; and emitting, by the anticounterfeiting feature, visible light when the anticounterfeiting features is illuminated by ultraviolet light, in which the emitted visible light is spectrally filtered by the anticounterfeiting feature.

In an example, the anticounterfeiting feature forms an optical filter configured to transmit ultraviolet (UV) light and block visible light at a wavelength range.

In an example, the anticounterfeiting feature includes a plurality of UV-sensitive fluorescent compounds dispersed therethrough, the plurality of UV-sensitive fluorescent compounds configured to emit the visible light when illuminated by ultraviolet light.

The details of one or more examples are set forth in the accompanying drawings and the description below. This summary does not purport to define the invention. The invention is defined by the claims.

BRIEF DESCRIPTION OF THE DRAWINGS

The foregoing and other objects of the present disclosure, the various features thereof, as well as the disclosure itself may be more fully understood from the following description, when read together with the accompanying drawings.

In the figures, like references indicate like elements.

DETAILED DESCRIPTION

Figure 1A:
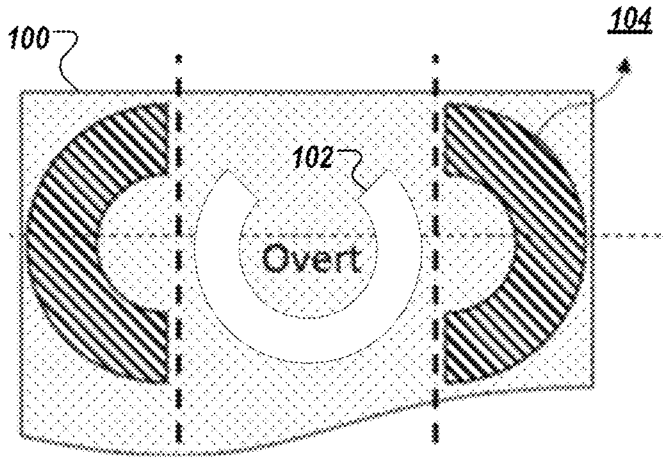
FIG. 1A is a diagrammatic representation showing the top view of an integrated security feature and the constituent layers in the foil stack in accordance with many examples of the disclosure.

The disclosures of these patents, patent applications, and publications in their entireties are hereby incorporated by reference into this application in order to more fully describe the state of the art as known to those skilled therein as of the date of the disclosure provided herein. The instant disclosure will govern in the instance that there is any inconsistency between the patents, patent applications, and publications and this disclosure.

Unless defined otherwise, all technical and scientific terms used herein have the same meaning as commonly understood by one of ordinary skill in the art to which this disclosure belongs. The initial definition provided for a group or term herein applies to that group or term throughout the present specification individually or as part of another group, unless otherwise indicated.

For the purposes of explaining the disclosure, well-known features of diffractive film technology known to those skilled in the art of anticounterfeiting have been omitted or simplified in order not to obscure the basic principles of the disclosure. See for example, U.S. Patent Application No. 63/127,638 and U.S. Patent Application No. 63/345,642. Parts of the following description will be presented using terminology commonly employed by those skilled in the art of optical design. It should also be noted that in the following description, repeated usage of the phrase "in one embodiment" does not necessarily refer to the same embodiment.

As used herein, the articles "a" and "an" refer to one or to more than one (i.e., to at least one) of the grammatical object of the article. By way of example, "an element" means one element or more than one element. Furthermore, use of the term "including" as well as other forms, such as "include," "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components have not been described in detail to avoid obscuring the examples described.

Particular implementations of the subject matter described in this specification can be implemented so as to realize one or more of the following technical advantages.

The present disclosure provides anticounterfeiting devices and methods of producing such anticounterfeiting devices integrate an overt diffractive or plasmonic-reflective feature and a metasurface-based device-assisted feature. The present anticounterfeiting device includes a functionalizing layer which operates both in reflection and transmission modes and offers interactive overt and covert functionalities under ambient and ultraviolet (UV) light, respectively. The integration of a single layer of coating material, such as, but not limited to, silver, enables, among other features, UV transparency, colorshift filtering of incident visible light, high diffraction efficiency when combined with blazed gratings, e.g., such as blazed gratings optimized for silver coating, and an optimized range of coating material thickness. The functionalizing layer may in some embodiments be a metallic thin film layer, such as silver or aluminum. In other embodiments, the functionalizing layer may be a dielectric layer with a high refractive index, such as Titanium Dioxide or Niobium Pentoxide.

The foil structure can use polymeric tie layers, e.g., a bonding agent layer, which reinforce the inter-layer adhesion and improve durability. Tie layers can be specifically formulated to enhance the adhesion between the functionalizing layer and its neighbouring layers in the foil stack. Tie layers can be a thin adhesive layer with optimized formulation that establishes bond between neighbouring layers and reinforces the robustness of the anticounterfeiting device against mechanical and chemical damage which can prevent failure of the anticounterfeiting device, such as delamination of one or more layers.

The present disclosure also provides methods of producing anticounterfeiting devices. The method steps to develop the foil body including, protective layer printing, embossed layer casting, UV ink printing, and adhesive printing are carried out on a sacrificial PET substrate of the foil. In some examples and using lamination, the sacrificial PET substrate is adhered to a secondary PET so the anticounterfeiting device is produced in a roll or strip format (e.g., a continuous device). In some examples, the roll or strip can be cut into individual devices and released conveniently during the feature application process on the application press.

The functionalizing layer is chosen to provide low dispersive loss at UV wavelengths and allow the UV light (illuminated from the top) to penetrate the foil stack and excite the UV ink pigments. The visible fluorescence from the excited UV ink is transmitted from the metasurface filter back to the incident side and provides a colorshift effect depending on the viewing angle. The single functionalizing layer enables the manufacturing feasibility without coating multiple areas of the foil with various materials, such as metallic materials like silver or aluminium.

An anticounterfeiting device 100 according to some examples of the present disclosure, which integrates an overt feature 102 and a covert (e.g., device-assisted) feature 104, is shown in FIG. 1A. The device 100 is film stack and includes multiple layers which diffracts incident visible light from the overt feature 102 and emits light at one or more prescribed wavelengths in the visible range when the covert feature 104 is exposed to ultraviolet light, for a given emission angle. In some cases, the device 100 may be used as anticounterfeiting features or may be used for any other applications that include emission of a particular wavelength at a particular viewing angle (e.g., for displaying an image that can change when viewing at different angles, and the like). The device 100 may be a part of a display, a part of a device, and the like.

In this particular example, the overt feature 102 includes diffractive micro-pixel elements which diffract incident light in the visible wavelength range, each micro-pixel including a plurality of micro-facets according to specific embodiments of the present disclose. The covert feature 104 is a metasurface optical filter designed to: (1) transmit UV light, which enables excitation of fluorescent compounds, and (2) partially filter a portion of visible light produced by the fluorescent compounds. The transmission spectra of metasurface optical filters may be tailored by changing the dispersion of optical modes in the metasurface layer to create a true-color or multi-color image.

The device 100 including both the micro-pixel-based overt feature 102 and the covert feature 104 increases the security of devices having the device 100. The complexity and security of the device 100 enables viewing of both viewing-angle-dependent images from the overt feature 102 from ambient and color-based images when the device 100 is exposed to ultraviolet light, facilitating multi-faceted protection of affixed devices.

Figure 1B:
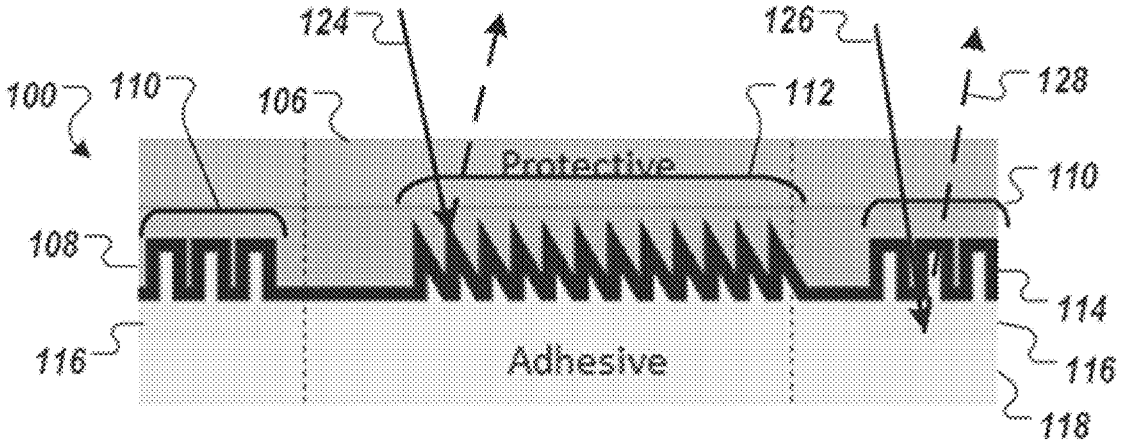
FIG. 1B is a diagrammatic representation showing the cross-sectional view of an integrated security feature and the constituent layers in the foil stack in accordance with many examples of the disclosure.

A cross-sectional view of the exemplary device 100 including the constituent layers is shown in FIG. 1B. The device 100 is a layered film stack having a resin layer 108 in which diffractive and metasurface nanostructures have been imprinted (e.g., embossed). A coating layer 114 is disposed on the resin layer 108 and the diffractive and metasurface nanostructures in combination of the optical properties of the coating layer 114 produce the overt feature 102 and/or the covert feature 104 when exposed to visible and/or ultraviolet light, respectively.

A visible light ray 124 is shown incident on the device 100 entering the protective layer 106. The visible light ray 124 has a wavelength in the visible light range (e.g., about 380 nm to about 700 nm). The visible light ray 124 enters the device 100 and interacts (e.g., diffracts from) with the diffractive nanostructures 112 and the coating layer 114 coating the diffractive nanostructures 112. The visible light ray 124 is modified by the diffractive nanostructures 112 to produce the overt feature 102 when viewed by a user. In some examples, the resin layer 108 includes plasmonic nanostructures that operate at below the diffraction limit, e.g., sub-wavelength of the incident light. In more detail, the resin layer 108 may include plasmonic nanostructures in addition to, or instead of the diffractive nanostructures 112. The plasmonic nanostructures may operate in transmissive or reflective modes, depending on their position on the device. In particular, in the region of the resin layer where the diffractive nanostructures 112 are shown, under which there is no ink layer 116, plasmonic nanostructures may be used in addition to or instead of the diffractive nanostructures to reflect incident light by plasmonic resonance. In the region of the resin layer where the device-assisted nanostructures are shown, under which there is an ink layer 116, plasmonic nanostructures may be used in addition to or instead of the diffractive nanostructures to transmit incident light by plasmonic resonance into the ink layer.

If the layer 114 is metallic, plasmonic resonances forming in this layer 114 tailor the spectral characteristics of reflected light, facilitating color filtration. The plasmonic resonances are enabled by the negative refractive index of the metallic thin film layer 114 and are localized or propagating surface plasmon resonances. In such implementations, subtractive color filtration is produced by the plasmonic resonance absorbing one part of the visible spectrum and reflecting the rest. The color filtering is driven by the absorption and is relatively broadband, e.g., typically >50 nm bandwidth. Implementations utilizing a metallic layer 114 may include silver, aluminum, or any other suitable metal known to the skilled person.

A UV light ray 126 is shown incident on the device 100 entering the protective layer 106. The UV light ray 126 has a wavelength in the ultraviolet light range (e.g., about 100 nm to about 380 nm). In some examples, the UV light ray 126 is produced by a device which illuminates the device 100 with ultraviolet light, hence "device-assisted." Metasurface filtering structure, e.g., the device-assisted nanostructures 110 and the coating layer 114 coating the device-assisted nanostructures 110, is a filter operating at visible wavelengths. The UV light ray 126 enters the device 100 and passes through the filtering structure. The UV light ray 126 enters the ink layer 116 and causes the ink to fluoresce and emit visible light, shown as light ray 128. The visible light ray 128 interacts with the filter, e.g., interacts with the material of the filter and the modal dispersion filters, to produce the optical effect when viewed by a user.

The resin layer 108 is a UV curable resin layer nanoimprinted with nanostructures and/or microstructures on a common surface, i.e., on the same surface. In some nonlimiting examples, the nanostructures and/or the microstructures are imprinted in a roll-to-roll process, such as, but not limited to, a flexographic printing process, a slot die process, a Mayer rod process, or Gravure printing process (see, for example, U.S. Pat. Nos. 6,343,550, 9,212,089, 1,043,021, and 3,675,572).

The resin layer 108, when functionalized by the coating layer 114, displays images according to a particular viewing angle and the wavelength of incident light. The viewing-angle dependent images are sometimes referred to as optical effects. The imprinting embeds one or more of: diffractive structures including blazed surface relief gratings; reflective plasmonic structures; transmissive plasmonic structures; other types of beam-steering metasurfaces, and/or different types of multifaceted microstructures (e.g., bi-facet, tri-facet, quadra-facet, microprism, micro-dome, etc.).

In some examples, the nanostructures are imprinted onto a flat surface of the resin layer 108. In some examples, microstructures are imprinted onto the surface of the resin layer 108 and nanostructures imprinted onto the microstructures. The resin layer 108 has a thickness greater than the height of the imprinted microstructures and/or nanostructures and may have a thickness of a few microns (μm) which can include up to about 15 μm (e.g., up to about 14 μm, up to about 13 μm, up to about 12 μm, up to about 11 μm, up to about 10 μm, up to about 9 μm, up to about 8 μm, up to about 7 μm, up to about 6 μm, or up to about 5 μm, or up to about 45 μm, or up to about 3 μm, or up to about 2 μm, or up to about 1 μm). Said another way, the thickness of the resin layer 108 may be in a range of about 1 μm to about 15 μm, including all the values and ranges in between.

The resin layer 108 may be formed from UV/thermal resin patterned with microstructures and/or nanostructures formed using nanoimprint lithography. The resin layer 108 may be an embossed layer that embeds shapes of metasurface nanostructures. Instead of UV resin (e.g., but not limited to, a photopolymer resin), thermoplastic resin can be used to form the resin layer 108, and the embossing methods will be thermal instead of photon-assisted in that case.

In some nonlimiting examples, the index of refraction of the resin layer 108 is selected based on the type of the incident light that is expected to illuminate the device 100. For example, if the ultraviolet incident light is in a wavelength between about 210 nanometers (nm) to about 400 nm, a UV light transparent material may be used (e.g., a fluoropolymer, and the like). In some cases, the resin layer 108 may be formed from photopolymer resin or a thermoplastic resin. The resin layer 108 may have an index of refraction in a range from about 1.38 and about 2 (e.g., about 1.4 to about 2, about 1.6 to about 2, about 1.8 to about 2, about 1.4 to about 1.8, about 1.4 to about 1.6, about 1.5 to about 1.9, about 1.6 to about 1.8, or about 1.7 to about 1.9).

The device 100 includes a first region of nanostructures 112 and a second region of nanostructures 110. The first region of nanostructures 112 may include diffractive nanostructures such as a periodic lattice of at least one type of micro-pixels. In the present disclosure, the term "micro-pixel" is utilized to describe the smallest micro-scale building block of a diffractive display with addressable display coordinates. Each micro-pixel has a 3D surface formed by a plurality of "micro-facets." The normal vectors of the micro-facets are configured to reflect the incident light into a desired polar and azimuthal angle. The physical size of a micro-pixel can be limited to suit the application, for example in relation with the resolution of a human eye, which restricts the size and number of embedded micro-facets per unit area.

Each of the micro-facets of a diffractive display functions as a micro-reflector that independently reflects an incident light beam toward different orientations in space due to the non-parallel surface normals of the micro-facets. Each micro-facet includes one or more diffractive nanostructure arrays that diffracts incident light beam into a specific azimuthal and polar angle in space, which is referred to herein as the viewing angle. In some examples, the diffractive nanostructure arrays may be blazed grating arrays. In addition to or instead of diffractive nanostructure arrays, the first region of nanostructures can host sub-wavelength plasmonic nanostructures (as described herein with respect to the filtering structures, and which may absorb part of the electromagnetic spectrum, and reflect a different part of the electromagnetic spectrum).

The micro-pixels of the resin layer 108 may be any shape that is suitable for providing a regular lattice of micro-pixels and can include squares. Further, the micro-pixels of the resin layer 108 may be any suitable surface such that at least some of the micro-facets have surface normals that are non-parallel, including, for example, microcylinders, micro-pyramids, micro-domes, bi-facets, and quadra-facets.

Each of the micro-facets of a diffractive display functions as a micro-reflector that independently reflects an incident light beam toward different orientations in space due to the non-parallel surface normals of the micro-facets. Each micro-facet includes one or more diffractive nanostructure arrays that diffracts incident light beam into a specific azimuthal and polar angle in space, which is referred to herein as the viewing angle. In some examples, the diffractive nanostructure arrays may be blazed grating arrays.

In general, the blazed grating array can be configured to diffract light of particular colors, e.g., red, green, and/or blue. A blazed grating array diffracting red light may have a periodicity of about 416 nm and a blaze angle of about 20° to about 30°, a blazed grating array configured to diffract green light may have a periodicity of about 512 nm and a blaze angle of about 20° to about 30°, and a blazed grating array configured to diffract blue light may have a periodicity of about 608 nm and a blaze angle of about 20° to about 30°. In some examples, the blazed grating array can be configured to diffract red, green, and/or blue light having peak wavelengths of about 615 nm, about 540 nm, or about 440 nm.

In general, depending on the color selected and any fine tuning to the preselected direction of the fundamental order of diffraction, the periodicity of each blazed grating array of each sub-pixel may be between about 300 nm and about 700 nm, such as about 400 nm, about 500 nm, or about 600 nm.

The combination of a blazed grating nano-structure array overlaid on a micro-facet of a 3D micro-pixel may provide an efficient diffractive color filter that diffracts the incident light beam into a specific diffraction channel having a polar angle and an azimuthal angle determined by the grating's periodicity, grating's azimuthal angle, as well as the micro-facet's polar and azimuthal angles.

In some examples, each micro-facet may include one or more sets of diffractive nano-structure arrays, each set independently displaying a unique color identified with a hue, a saturation, and a luminance value. The values of hue, saturation and luminance are determined by the size and periodicity of each of diffractive nano-structure arrays along with the spectrum of the incident light, or the backlight if the diffractive display is backlit.

In an example, a color pixel may be comprised of three diffractive nano-structure arrays, each of which may be referred to herein as a "sub-pixel". For example, the three sub-pixels of a set may be configured to diffract wavelengths of red, green, and blue colored light, respectively. The area of each sub-pixel may be adjusted to control the optical power of each associated color component, as well as the total optical power of the color pixel such that the combined diffracted light component from each sub-pixel provides the intrinsic hue, saturation, and luminance values of the color pixel.

The second region of nanostructures 110 may include device-assisted nanostructures 110 are a periodic array of nanostructures embossed in the resin layer 108 and may include periodically formed structures having a characteristic size that varies between a few tens of nanometers to a few hundred nanometers or even to a few micrometers. The size of the structures may be dependent on the wavelength of light emitted by the ink layer 116 and/or the wavelength of light incident onto the device 100. For example, each nanostructure in the device-assisted nanostructures 110 may have a size of at least about 20 nm, at least about 50 nm, at least about 100 nm, at least about 150 nm, at least about 200 nm, at least about 250 nm, or at least about 300 nm; each nanostructure in the periodic array may have a size of no more than about 400 nm, no more than about 450 nm, no more than about 500 nm, no more than about 550 nm, no more than about 600 nm, or no more than about 700 nm. Combinations of the above-referenced ranges for the size are also possible (e.g., about 20 nm to about 700 nm, about 50 nm to about 600 nm, about 100 nm to about 500 nm, about 100 nm to about 450 nm, about 150 nm to about 400 nm, about 200 nm to about 350 nm, about 250 nm to about 300 nm, about 100 nm to about 700 nm, about 200 nm to about 700 nm, about 300 nm to about 700 nm, about 400 nm to about 700 nm, about 500 nm to about 700 nm, about 600 nm to about 700 nm, about 20 nm to about 600 nm, about 20 nm to about 500 nm, about 20 nm to about 400 nm, or about 20 nm to about 300 nm). The characteristic size of the nanostructures may be the largest size measured across the structure, i.e., the largest dimension. In addition to or instead of the device-assisted nanostructures, the second region of nanostructures may also comprise plasmonic nanostructures that operate in a transmission mode to transmit incident UV light to the ink layer 116 by plasmonic resonance. The plasmonic resonance provides color filtering on the light incident on the ink layer and/or the fluorescent light emitted from the ink layer.

The combination of the periodic array of nanostructures 112 and the coating layer 114 forms an optical filter configured to filter visible light at a certain wavelength range. For such a configuration, the nanostructures may have a vertical dimension (i.e., a height) that ranges between a few tens of nanometers to a few hundreds of nanometers (e.g., between about 40 nm and about 300 nm, between about 80 nm and about 260 nm, between about 120 nm and about 220 nm, between about 160 nm and about 180 nm, between about 200 nm and about 300 nm, between about 160 nm and about 300 nm, between about 120 nm and about 300 nm, between about 80 nm and about 300 nm, between about 40 nm and about 120 nm, between about 80 nm and about 200 nm, about 40 nm, about 80 nm, about 100 nm, about 120 nm, about 150 nm, about 180 nm, about 220 nm, and about 260 nm), and a lateral dimension that ranges between a few tens of nanometers to a few hundreds of nanometers (e.g., between 90 nm and about 300 nm, between about 120 nm and about 260 nm, between about 120 nm and about 220 nm, between about 160 nm and about 180 nm, between about 200 nm and about 300 nm, between about 160 nm and about 300 nm, between about 120 nm and about 300 nm, between about 80 nm and about 300 nm, between about 90 nm and about 120 nm, between about 90 nm and about 200 nm, about 100 nm, about 120 nm, about 150 nm, about 180 nm, about 220 nm, and about 260 nm). Such nanostructures may be formed using any suitable approaches (e.g., but not limited to, e-beam lithography, UV photolithography, etching, imprinting, epitaxial growth, or a combination thereof).

The optical filter is configured to transmit UV light and block visible light at a selected wavelength range (the wavelength range that is filtered by the optical filter is determined by the characteristics of the layers 108 and 114, such as the parameters of the periodic arrays 110 and 112, material, and thickness of the resin layer 108, and/or material and thickness of the coating layer 114).

The device-assisted nanostructures 110 may have a periodicity of about 120 nm to about 700 nm, (e.g., about 200 nm to about 700 nm, about 300 nm to about 700 nm, about 400 nm to about 700 nm, about 500 nm to about 700 nm, about 600 nm to about 700 nm, about 120 nm to about 500 nm, about 120 nm to about 300 nm, about 200 nm to about 500 nm, about 300 nm to about 500 nm, about 300 nm to about 600 nm, about 400 nm to about 500 nm, about 200 nm, about 350 nm, about 450 nm, about 550 nm, or about 650 nm). The device-assisted nanostructures 110 with periodicity greater than about 350 nm may diffract. If a device-assist optical effect with a muted diffraction under normal and UV lighting conditions is desired, the periodicity may be selected between about 120 nm and about 300 nm. The device-assisted nanostructures 110 may have tens or hundreds of rows (and/or columns). The number of columns is determined by the pixel size divided by the x periodicity, while the number of rows is determined by the pixel size divided by the y periodicity. For instance, the device-assisted nanostructures 110 may have up to about 400 columns and/or up to about 400 rows. In some examples, the periodic array has up to about 350 columns and/or up to about 350 rows. In some examples, the periodic array has up to about 300 columns and/or up to about 300 rows. In some examples, the periodic array has up to about 250 columns and/or up to about 250 rows. In some examples, the periodic array has up to about 200 columns and/or up to about 200 rows. In some examples, the periodic array has up to about 150 columns and/or up to about 100 rows. In some examples, the periodic array has up to about 100 columns and/or up to about 100 rows.

The nanostructures may have any suitable shape (e.g., the nanostructures may be hemispherical elements, pyramids, cones, truncated cones, columns (e.g., pillars) with a rectangular cross-section, columns (e.g., pillars) with a circular, hexagonal, or cross cross-section, cubical cavities (e.g., holes), hexagonal cavities, conical cavities, columnar cavities, hemispherical cavities, and the like. For instance, the cross-sectional shape of the nanostructures may include a rectangle, a triangle, a circle, a pentagonal, a hexagonal, and the like.

A thickness of the periodic array of nanostructures 110 may vary between about 50 nm and about 300 nm (e.g., about 50 nm and about 300 nm, about 50 nm and about 250 nm, about 50 nm and about 200 nm, about 50 nm and about 150 nm, about 50 nm and about 100 nm, about 150 nm and about 300 nm, about 100 nm and about 300 nm, about 250 nm and about 300 nm, about 200 nm and about 300 nm, about 50 nm, about 100 nm, about 150 nm, about 200 nm, or about 250 nm). The thickness may change depending on the process of forming the periodic array of nanostructures 110 or parameters of the metastructure optical filter. In some cases, the thickness of the resin layer 108 can be up to about 10 μm for some of the metastructure optical filters. In some cases, the nanostructures may include sublayers configured to further alter the average index of refraction of the nanostructures or configured to guide light within the nanostructures.

The device 100 includes a coating layer 114 overlaid the device-assisted and/or transmissive plasmonic nanostructures 110 and the diffractive and/or reflective plasmonic nanostructures 112 of the resin layer 108. The coating layer 114 may be a metallic layer, e.g., but not limited to, a silver or aluminum layer. The coating layer 114 and the device-assisted nanostructures 110 form a metasurface optical filter (herein also referred to as a metasurface filter or simply an optical filter) configured to transmit an incoming light (e.g., the incoming light may be an ultraviolet light having at least one wavelength in the range of about 210 nm to about 470 nm (e.g., about 210 nm to about 470 nm, about 320 nm to about 470 nm, about 350 nm to about 470 nm, about 380 nm to about 470 nm, about 410 nm to about 470 nm, about 210 nm to about 410 nm, about 210 nm to about 380 nm, about 210 nm to about 350 nm, about 210 nm to about 310 nm, about 320 nm to about 420 nm, about 350 nm to about 390 nm, about 450 nm, about 410 nm, about 380 nm, about 350 nm, about 310 nm, about 260 nm), including any wavelength values in between) and block at least some visible wavelengths (e.g., block a range of wavelengths in the visible range). To reflect light, the surface of the diffractive nanostructures 112 are covered with the coating layer 114 which can include a reflective material. The combination of the coating layer 114 and the device-assisted and/or transmissive plasmonic nanostructures 110 form the optical effect of the covert feature 104 and the combination of the coating layer 114 and the diffractive and/or reflective plasmonic nanostructures 112 form the optical effect of the overt feature 102.

The coating layer 114 is disposed on the imprinted resin layer 108. In some cases, some surfaces of the diffractive and/or reflective plasmonic nanostructures 112 and/or the device-assisted and/or transmissive plasmonic nanostructures 110 are coated, while other surfaces may not be coated. For example, when the device-assisted nanostructures 110 are columns having top surfaces and side surfaces, the top surfaces may be coated while the side surfaces may not be coated. Alternatively, both top surfaces and side surfaces may be coated. The coating of the nanostructures may depend on the method used for coating. For example, when sputtering is used, the side surfaces of the nanostructure may be coated, and when an e-beam or thermal evaporation is used, the side surfaces of the nanostructures may not be coated.

In some cases, the diffractive and/or reflective plasmonic nanostructures 112 and/or the device-assisted and/or transmissive plasmonic nanostructures 110 may not be coated uniformly. For example, when the device-assisted nanostructures 110 are columnar cavities, the bottom of these cavities may have a larger layer thickness than the sides of these cavities. In one case, the layer thickness may fluctuate by at least about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or about 100%, of the smallest layer thickness value. Alternatively, the coating layer may be relatively uniform (e.g., the layer thickness may fluctuate by less than about 50%.

In some cases, the coating layer 114 may be made from a metallic material such as aluminum, silver, alloys thereof, or combinations thereof. In some implementations, the coating layer 114 may have multiple metallic sublayers. Additionally, when the coating layer 114 is formed from the metallic material, the metals may be annealed (e.g., heated) during or after the deposition. In some cases, the coating layer 114 may include multiple sublayers with at least some sublayers being metallic.

When the coating layer 114 comprises a metallic material, e.g., silver, the coating layer 114 may have a thickness in a range from about 30 nm to about 40 nm including all the values and ranges in between, e.g., the coating layer 114 may have a thickness of about 30 nm, about 35 nm, about 40 nm, about 31 nm, about 32 nm, about 33 nm, about 34 nm, about 35 nm, about 36 nm, about 37 nm, about 38 nm, about 39 nm, or about 40 nm. In particular, the thickness of the coating layer 114 is selected such that the attenuation of the incoming light (e.g., the visible light ray 124 and/or the UV light ray 126) by the coating layer 114 is sufficiently small (e.g., no more than about 5%, no more than about 10%, no more than about 15%, or no more than about 20%), such that the incoming light can illuminate the ink layer 116, and cause emission of light 123.

The coating layer 114 provides the material and modal dispersion properties for spectral filtering. If the coating layer 114 is metallic, the plasmonic resonances forming in this layer may tailor the spectral characteristics of the optical filter. These plasmonic modes are enabled by the negative refractive index of the thin metallic film and form at the interface of the thin metal layer and the surrounding resin matrix.

The anticounterfeiting device 100 includes an ink layer 116 which emits visible light when illuminated with ultraviolet light. The ink layer 116 disposed on or in proximity to a portion of the coating layer 114 which corresponds to the coated device-assisted nanostructures 110. The remaining coating layer 114 corresponding to the diffractive and/or reflective plasmonic nanostructures 112 is not covered by the ink layer 116, e.g., is left exposed to subsequent layers of the device 100. The ink layer 116 functions as an embedded light source for the metasurface optical filter, e.g., the combination of the device-assisted nanostructures 110 and the coating layer 114.

The ink layer 116 may be formed from a plurality of fluorescent compounds dispersed therethrough. For example, the ink layer 116 comprises different types of fluorescent compounds which fluoresce at different ranges of visible spectrum under UV light excitation (350 nm-400 nm). The mixing ratio of the types of fluorescent compounds determines the wavelength and intensity of the emitted light from the ink layer 116. When the ink layer 116 is illuminated by the incident UV light ray 126 (e.g., when the incident light is a UV light), the fluorescent compounds of the ink layer 116 are configured to emit visible light, which is further filtered by the optical filter formed by layers 111 and 113. In some implementations, the ink layer 116 may include a binding agent or a UV curable resin. The ink layer 116 may have a thickness of a few microns. For example, the ink layer 116 may have a thickness that ranges between about 1 μm and about 10 μm (e.g., but not limited to about 2 μm or more, about 3 μm or more, about 5 μm or more, about 8 μm or less, about 6 μm or less).

The device 100 includes a protective layer 106 overlying the resin layer 108 on a surface opposite the microstructures and/or the nanostructures. The protective layer 106 substantially transmits visible and ultraviolet light (e.g., the protective layer 106 is formed from a material with low absorption of visible light). For example, the protective layer 106 can transmit at least about 60%, about 70%, about 80%, about 90%, about 95%, or about 99% of visible light. Further the protective layer 106 can transmit at least about 50%, about 60%, about 70%, about 80%, or about 90% of the ultraviolet light. In some cases, the protective layer 106 substantially transmits ultraviolet light that has a wavelength in a range of about 210 nm to about 460 nm, including all the wavelength values in between.

The protective layer 106 is sufficiently thin to prevent significant attenuation of the visible and/or ultraviolet light. In one implementation, the protective layer 106 may be a few microns thick. For example, the protective layer 106 may have a thickness of about 2 μm to about 4 μm. In some implementations, the protective layer 106 includes a polymer that has a refractive index matching that of the resin layer 108 (when the refractive index is measured for a visible light or/and for the ultraviolet light). In some cases, the protective layer 106 may have an index of refraction that is at most about 10% different from the index of refraction of the resin layer 108. The protective layer 106 may be any suitable polymer, such as a lacquer or varnish, which may be either water-based, UV-curable, or thermal curable. In general, the protective layer 106 may be any chemically stable layer that is transparent to UV and visible light, can be thin enough to be used in security features, and adheres to the resin layer 108.

The protective layer 106 may have multiple functions. In one implementation, the protective layer 106 may be configured to protect the device 100 from a mechanical and/or chemical damage. For example, the protective layer 106 is configured to protect elements/layers underneath the protective layer 106. In some cases, various components of a device that includes device 100 may be protected by the protective layer 106 against mechanical, chemical damage, or damage due to the ultraviolet irradiation. Further, the protective layer 106 may be an anti-reflective layer and include suitable sublayers causing the anti-reflective properties of the protective layer 106.

The anticounterfeiting device 100 includes an adhesive layer 118 for adhering the device 100 onto a substrate, which can be flexible or rigid. The adhesive layer 118 has a refractive index similar to that of the coating layer 214. The adhesive layer 118 may have a thickness of a few microns or a few tens of microns. For example, the adhesive layer 118 may have a thickness of about 8 μm to about 25 μm (e.g., about 8 μm to about 20 μm, about 8 μm to about 16 μm, about 8 μm to about 12 μm, about 12 μm to about 25 μm, about 16 μm to about 25 μm, about 12 μm to about 16 μm, about 10 μm). The adhesive layer 118 may be a water-based adhesive, pressure sensitive adhesive, a latent reactive adhesive, or a thermoplastic adhesive. Some examples of the adhesive layer 118 include an extra layer which is a primer and is usually about 3 μm to about 6 μm thick (e.g., about 3 μm to about 4 μm, about 3 μm to about 5 μm, about 4 μm to about 5 μm, about 3 μm, about 4 μm, about 5 μm, or about 6 μm). The primer layer promotes adhesion. The adhesive layer 118 may include various adhesive layer components. For example, such components may include Nolax 535.3110, Nolax 535.3218, and Stahl XR-5508. In some cases, Nolax 535.3110 may be a leading primer layer adhesive, Nolax 535.3218 may be an adhesive layer, and Stahl XR-5508 may be a crosslinker.

Figure 1C:
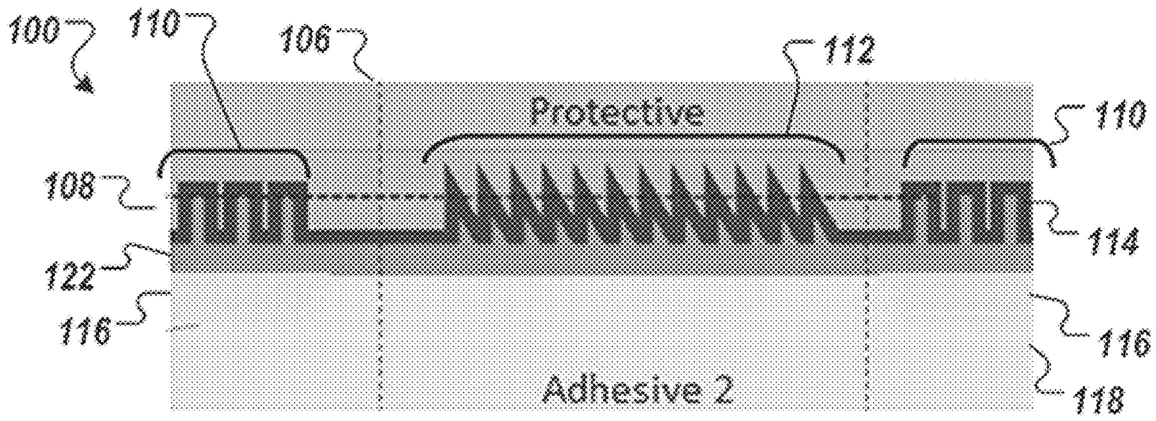
FIG. 1C is a diagrammatic representation showing the cross-sectional view of an integrated security feature and the constituent layers in the foil stack including a bonding agent layer in accordance with many examples of the disclosure.

In some examples, an anticounterfeiting device 100' includes a bonding layer 122 which is shown in FIG. 1C. The bonding layer 122, such as polymeric tie layers, reinforces the inter-layer adhesion and improves durability. The bonding layer 122 can be specifically formulated to enhance the adhesion between the coating layer 114 and neighbouring layers in the foil stack, e.g., between the coating layer 114 and the ink layer 116. In one example, the bonding layer 122 is a thin adhesive layer with optimized formulation that establishes a bond with a mettalic coating layer 114, e.g., silver, and the neighbouring layers (e.g., layers arranged at the opposing surface from the resin layer 108) and reinforces the robustness of the device 100' against mechanical and chemical damage. The layer 122 can have a thickness of up to about 2 μm (e.g., up to about 0.5 μm, up to about 1 μm, up to about 0.8 μm, up to about 1.2 μm, up to about 1.8 μm, about 0.2 μm, about 0.2 μm, about 0.4 μm, about 0.6 μm, about 0.8 μm, about 1.0 μm, about 1.2 μm, about 1.8 μm, or about 1.6 μm).

In various examples, the devices described herein (e.g., the device 100 or the device 100') emit visible light from a top surface of the device, e.g., the protective layer 106 or the second side of the resin layer 108 (e.g., the side opposite to the side coated by the coating layer 114) if a protective layer is not present. This light is emitted by the ink layer 116 and transmitted by the overlying layers (e.g., resin layer 108 and protective layer 106). In various examples, the light emitted from the device may be angle-variant. For example, if the emitted light has a particular wavelength (e.g., the emitted light is of a particular visible color, such as red, green, or blue light), the wavelength or light may be emitted at various angles. In some examples, the emitted light from the device may be angle-invariant.

In certain examples, some of the above-mentioned layers 106, 108, 114, 116, or 118, may be absent. For example, in some configurations, the adhesive layer 118, substrate layer 120, and/or protective layer 106 may be absent.

Figure 2A:
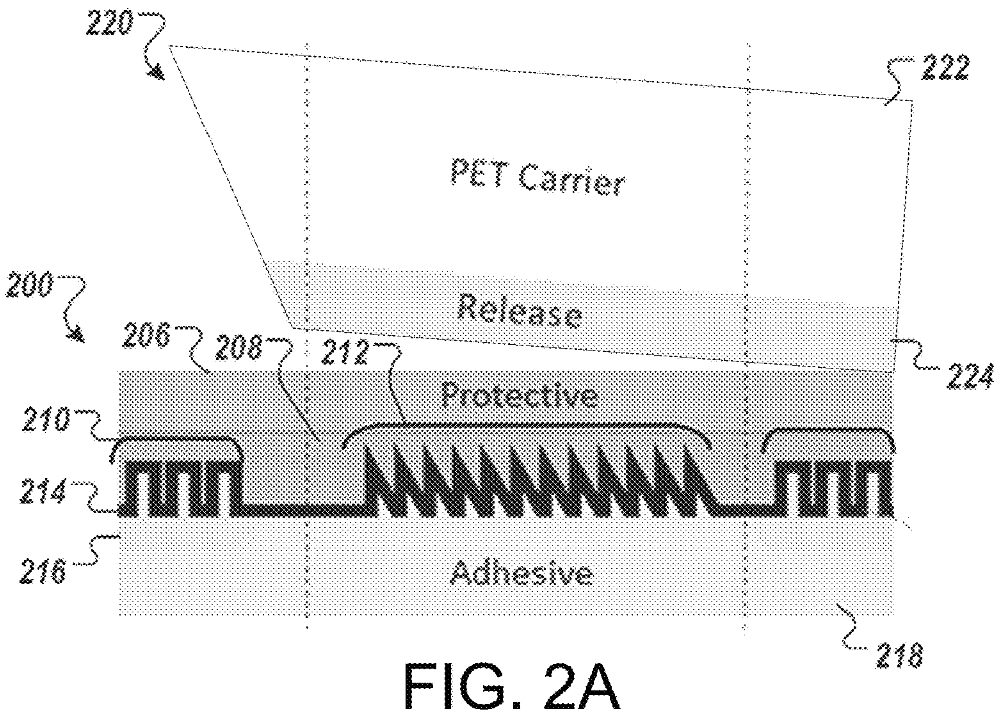
FIG. 2A is a schematic representation showing the cross-sectional view of an integrated security feature and a release layer in accordance with many examples of the disclosure.
Figure 2B:
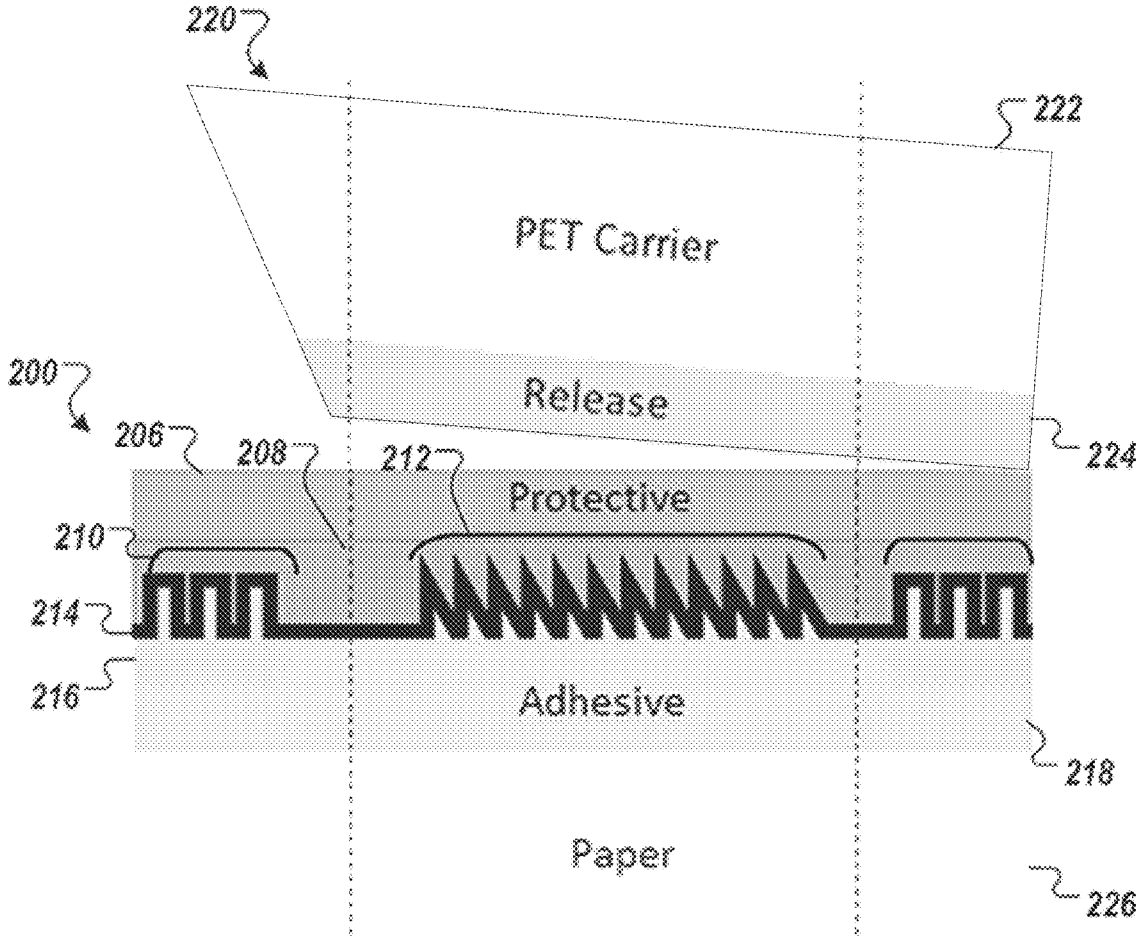
FIG. 2B is a schematic representation showing the cross-sectional view of the release layer and an integrated security feature contacted to a paper substrate in accordance with many examples of the disclosure.

The anticounterfeiting devices 100 or 100' can be formed on a precoated release layer to facilitate transfer of the device onto a final substrate. For example, a release layer 220 composed of a carrier substrate 222 affixed to the top surface of the protective layer 106 by a release adhesive layer 224 is shown in FIG. 2A. Generally, the carrier substrate 222 is a flexible layer that facilitates placement and transfer of the device 100 to the final substrate. Polymers such as polyethylene terephthalate (PET) can be used for this purpose. The release adhesive layer 224 is a thermally activated adhesive layer and enables peeling the release layer 220 after application of the device 100 onto a final substrate 226, as shown in FIG. 2B. After application, the device is adhered to the substrate 226 by adhesive layer 118, with the protective layer 106 facing away from the substrate 226. The release layer 220 can be discarded after application of the device 100 to the substrate 226.

In general, the substrate 226 can be a flexible substrate (e.g., but not limited to paper or flexible polymer) or inflexible substrate (e.g., but not limited to, glass or rigid plastic). Some examples of the substrate 226 include a paper, polymer, or blended paper-polymer banknote. Examples of polymers that can be used include polyvinyl chloride acetate (PVC), polylactic acid (PLA), polypropylene. Examples of paper that can be used include cotton papers. Textiles, such as silk, can also be used. The adhesive layer 218 is adhered to the substrate 226 such that the device 200 is affixed to the substrate 226. The mode of adhesion is dependent on the material of the adhesive layer 218, e.g., a thermally sensitive adhesive is thermally adhered to the substrate 226 while a pressure-sensitive adhesive is pressed against the substrate 226 to bond the device 200 to the substrate 226.

Figure 2C:
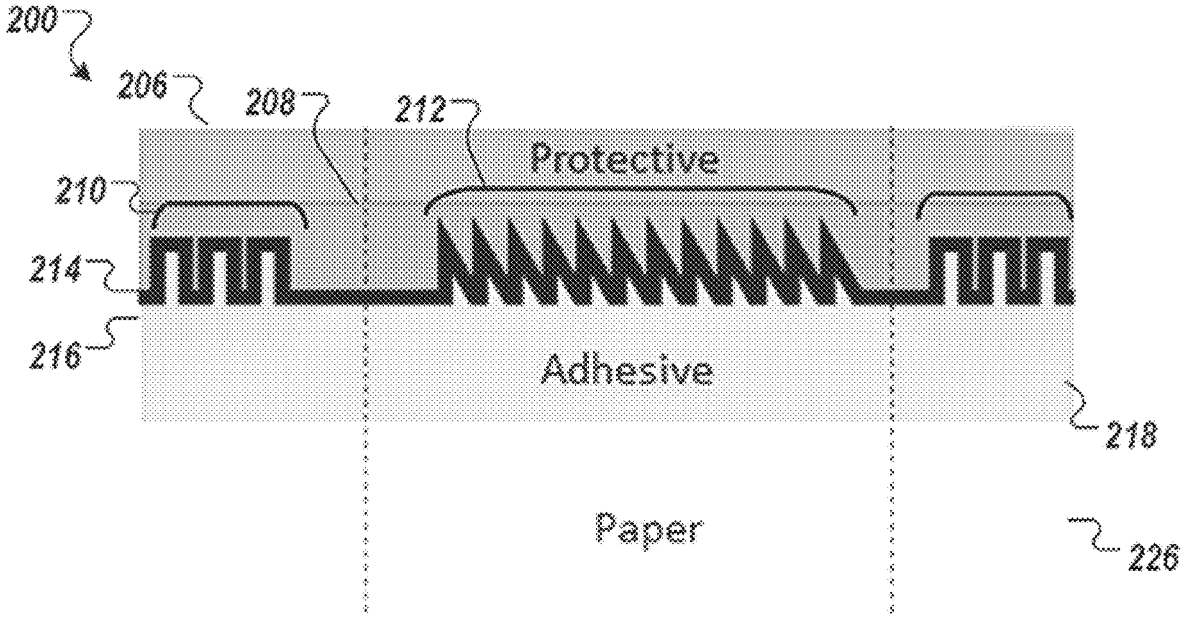
FIG. 2C is a schematic representation showing the cross-sectional view of an integrated security feature attached to a paper substrate in accordance with many examples of the disclosure.

The release adhesive layer 224 is released from the device 100 and the release layer 220 removed from proximity of the device 100 as shown in FIG. 2C. The mode of release of the release adhesive layer 224 is dependent on the material, e.g., a thermally sensitive release adhesive layer 224 is heated until the adhesive properties of the release adhesive layer 224 are reduced to a point at which the release layer 220 can be removed from the device 100 without damage to the device 100. The device 100 is then permanently or semi-permanently adhered to the substrate 226.

Figure 3:
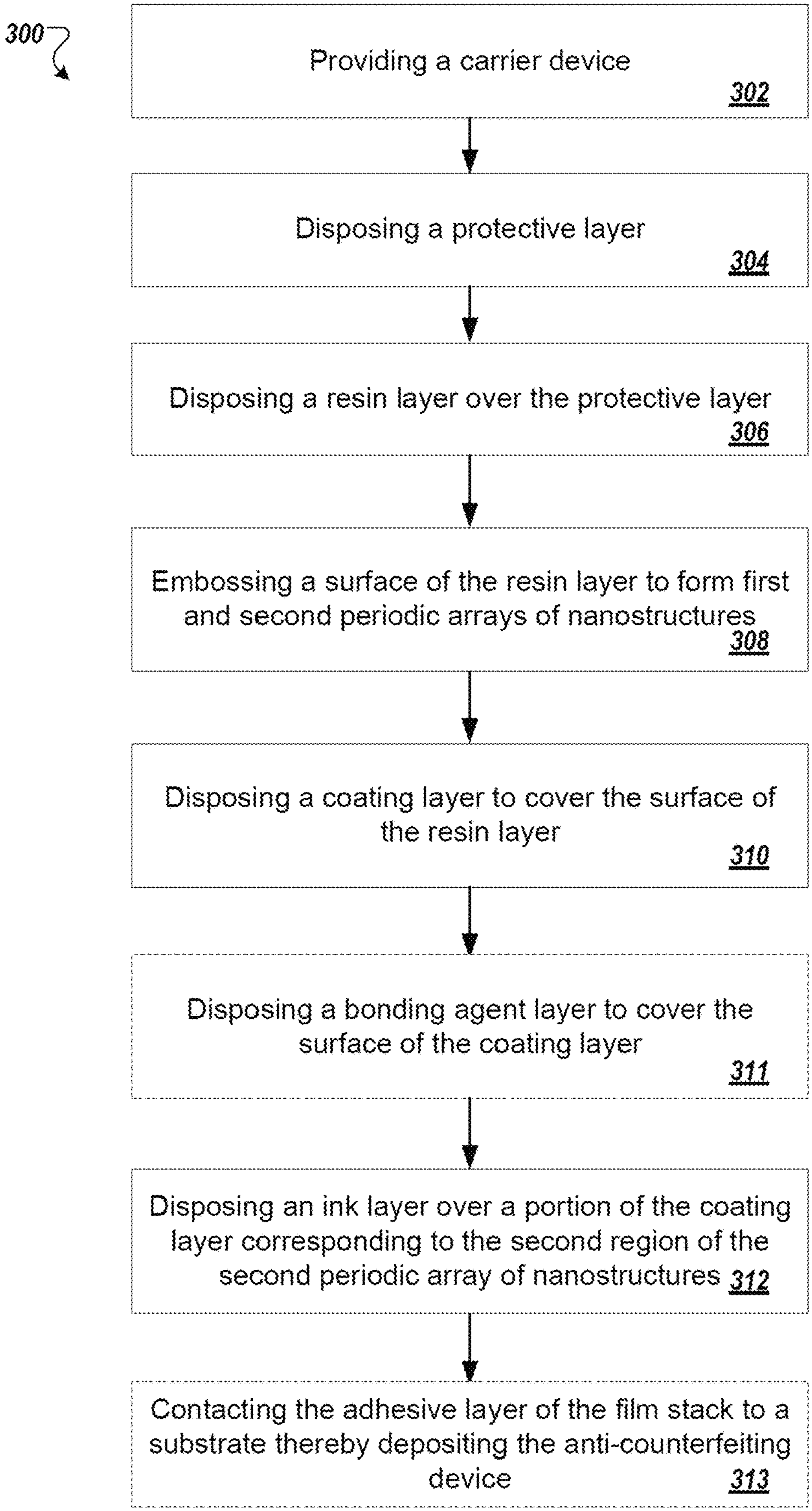
FIG. 3 is a diagrammatic flow chart showing a method of producing an integrated security feature in accordance with many examples of the disclosure.

In some examples, the release layer 220 serves as a sacrificial substrate on which the device 100 is formed. An exemplary method of production of the device 100 or device 100', which includes the use of a release layer, is described further herein with respect to FIG. 3. The method 300 includes forming a film stack configured to display an image or images and emit a color (or colors) in the visible range, wherein the forming includes providing (302) a release layer, such as the release layer 220 described above. The release layer serves as a substrate on which the layers forming the device can be formed. The release layer includes a carrier substrate and an adhesive layer, e.g., release adhesive layer 224, which reversibly adheres subsequent layers onto the carrier substrate.

The method 300 includes disposing (304) a resin for forming a protective layer onto the release adhesive layer of the release layer. The protective layer supplies a surface on which to form the remaining film stack. As described previously, the protective layer adds durability to the completed anticounterfeiting device when the device is affixed to a substrate.

The method 300 includes disposing (306) a second resin for forming a resin layer over the protective layer. The resin layer, such as resin layer 108 described above, is a moldable layer in which various microstructures and/or nanostructures are imprinted. In one example, the resin layer is a UV curable resin layer.

The method 300 includes embossing (308) a surface of the resin layer opposing the protective layer to form a periodic array of device-assisted nanostructures and/or transmissive plasmonic structures in a first region and a periodic array of diffractive nanostructures and/or reflective plasmonic nanostructures in a second region. The device-assisted nanostructures 110 and the diffractive nanostructures 112 of the device 100 in FIG. 1B and the device 100' in FIG. 1C are examples of such features. The nanostructures and/or the microstructures can be imprinted in a roll-to-roll process.

The method 300 includes disposing (310) a coating layer to cover the pattern surface of the resin layer. The coating layer may be a metallic layer, such as the coating layer 114 described above. In other examples, the coating layer is not metallic, but is a dielectric material with a high refractive index such as Titanium Dioxide or Niobium Pentoxide. The coating layer functionalizes the device-assisted and/or transmissive plasmonic nanostructures and the diffractive and/or reflective plasmonic nanostructures of the resin layer such that the nanostructures display images and/or colors according to a particular viewing angle and the wavelength of incident light. The displayed images and/or colors form overt and covert features when viewed by a user at various viewing angles and under certain illumination conditions.

The method 300 optionally includes disposing (311) a bonding agent layer to cover the coating layer. The bonding agent layer, such as bonding layer 122 described above, reinforces the inter-layer adhesion and improves durability of the anticounterfeiting device. Some examples of the bonding agent layer are specifically formulated to enhance the bond between a coating layer and neighboring polymeric layers.

The method 300 includes disposing (312) an ink layer over a portion of the coating layer corresponding to the periodic array of device-assisted nanostructures. An example of an ink layer is the ink layer 116 described above. The ink layer emits visible light when illuminated by ultraviolet light. The visible light emitted by the ink layer is filtered by the functionalized device-assisted nanostructures and/or transmissive plasmonic nanostructure when passing through the anticounterfeiting device to produce visible light of one or more colors. The filtered visible light produces the covert feature optical effect of the anticounterfeiting device.

The method 300 also optionally includes contacting (313) the adhesive layer of the film stack to a substrate thereby depositing the anticounterfeiting device, e.g., the film stack, on the substrate. Some examples of the substrate include a paper or polymer banknote.

Generally, each of the disposing steps described in method 300 can be performed using various coating or printing processes, such as flexographic printing, a slot die coating, a Mayer rod coating, or Gravure printing. Certain disposing steps can be performed using various deposition processes, such a physical vapor deposition, evaporation, etc.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. Although various features of the approach of the present disclosure have been presented separately (e.g., in separate figures), the skilled person will understand that, unless they are presented as mutually exclusive, they may each be combined with any other feature or combination of features of the present disclosure.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple examples separately or in any suitable subcombination.

Those skilled in the art will recognize, or be able to ascertain, using no more than routine experimentation, numerous equivalents to the specific examples described specifically herein. Such equivalents are intended to be encompassed in the scope of the following claims.

What is claimed is:

1. A device, comprising:

a film stack configured to display a plurality of images and to emit light in a visible range, the film stack comprising:

a resin layer comprising:

a first periodic array of nanostructures in a first region; and a second periodic array of nanostructures in a second region, the first region and the second region being on a common surface of the resin layer;

a coating layer disposed over the common surface of the resin layer, the coating layer and the first periodic array of nanostructures being configured to interact with incident light to display the plurality of images to a user, each of the plurality of images being presented independently at respective different viewing angles; and an ink layer disposed over a portion of the coating layer, the portion corresponding to the second region of the second periodic array of nanostructures, the ink layer being configured to emit visible light when illuminated by incident ultraviolet light, wherein the coating layer and the second periodic array of nanostructures are configured so that incident ultraviolet light is transmitted through the second periodic array of nanostructures and the coating layer to the ink layer, and so that incident visible light emitted by the ink layer is filtered to produce an optical effect when viewed by the user.

2. The device of claim 1, wherein the ink layer comprises a plurality of UV-sensitive fluorescent compounds dispersed therethrough that emit visible light when illuminated by the incident ultraviolet light.

3. The device of claim 1, wherein the first periodic array of nanostructures includes diffractive nanostructures, and wherein the coating layer and the first periodic array of nanostructures are configured to diffract incident light to display the plurality of images to the user.

4. The device of claim 1, wherein the coating layer and the first periodic array of nanostructures are configured to reflect incident light by plasmonic resonance to display the plurality of images.

5. The device of claim 1, wherein the ink layer has a thickness in a range from 1 μm to 15 μm.

6. The device of claim 1, further comprising:

a protective layer disposed over a surface of the resin layer opposing the common surface.

7. The device of claim 6, wherein the protective layer comprises a water-based material, a UV-curable material, or thermally curable material.

8. The device of claim 6, wherein the protective layer is disposed to a depth of 2 μm to 5 μm.

9. The device of claim 6, wherein the protective layer is substantially transparent to the incident visible light and the incident ultraviolet light and has a refractive index within 0.1 of a refractive index of the resin layer and is configured to protect the device from mechanical and chemical damage.

10. The device of claim 1, further comprising:

a bonding agent layer disposed between the coating layer and the ink layer, the bonding agent formulated to be substantially transparent to the incident visible light and the incident ultraviolet light and configured to protect the coating layer and the ink layer from delamination.

11. The device of claim 1, wherein the first periodic array of nanostructures, or the second periodic array of nanostructures, comprises a periodic array of blazed gratings, reflective plasmonic structures, or transmissive plasmonic structures.

12. The device of claim 1, wherein the first periodic array of nanostructures includes a periodic array of blazed gratings and is 300 nm or more in width, and each of the blazed gratings have a respective periodicity that is between 300 nm and 700 nm and a respective blaze angle of between 20° and 30°.

13. The device of claim 1, wherein the first periodic array of nanostructures includes a periodic array of plasmonic reflective nanostructures, and each of the plasmonic reflective nanostructures has a respective periodicity that is between 100 nm and 300 nm.

14. The device of claim 1, wherein the second periodic array of nanostructures has a periodicity of 120 nm to 700 nm, and each nanostructure has a height of 50 nm to 300 nm, and a lateral dimension of 90 nm to 300 nm.

15. The device of claim 1, wherein the first periodic array of nanostructures and the second periodic array of nanostructures are overlaid on a periodic array of microstructures, each microstructure having a largest dimension greater than a periodicity of the overlaid periodic array of nanostructures.

16. The device of claim 1, wherein the coating layer comprises:

a metallic material selected from the group consisting of aluminum, silver, alloys thereof, and a combination thereof, wherein the coating layer has a thickness in a range from 30 nm to 40 nm.

17. A method, comprising:

forming a film stack configured to display a plurality of images and emit a color in a visible range, the forming comprising:

providing a carrier layer comprising a release layer;

disposing a protective layer onto the release layer;

disposing a resin layer over the protective layer;

embossing a surface of the resin layer opposing the protective layer to form a first periodic array of nanostructures in a first region and a second periodic array of nanostructures in a second region;

disposing a coating layer to cover the surface of the resin layer, the coating layer and the first periodic array of nanostructures being configured to interact with incident visible light to display the plurality of images, each of the plurality of images being presented independently at respective different viewing angles of incident visible light diffracted from the first periodic array of nanostructures; and disposing an ink layer over a portion of the coating layer corresponding to the second region of the second periodic array of nanostructures, the ink layer being configured to emit visible light when illuminated by incident ultraviolet light, wherein the coating layer and the second periodic array of nanostructures are configured so that incident ultraviolet light is transmitted through the second periodic array of nanostructures and the coating layer to the ink layer, and so that incident visible light emitted by the ink layer is filtered to produce an optical effect when viewed by a user.

18. The method of claim 17, further comprising:

disposing a bonding agent layer between the coating layer and the ink layer, the bonding agent formulated to be substantially transparent to the incident visible light and the incident ultraviolet light, and configured to protect the coating layer and the ink layer from delamination.

19. The method of claim 18, further comprising disposing the film stack onto a substrate, wherein the substrate comprises a paper or a polymer.

20. The method of claim 17, further comprising:

disposing an adhesive layer to cover the exposed first region and the ink layer.

* * * * *